Patented July 20, 1943

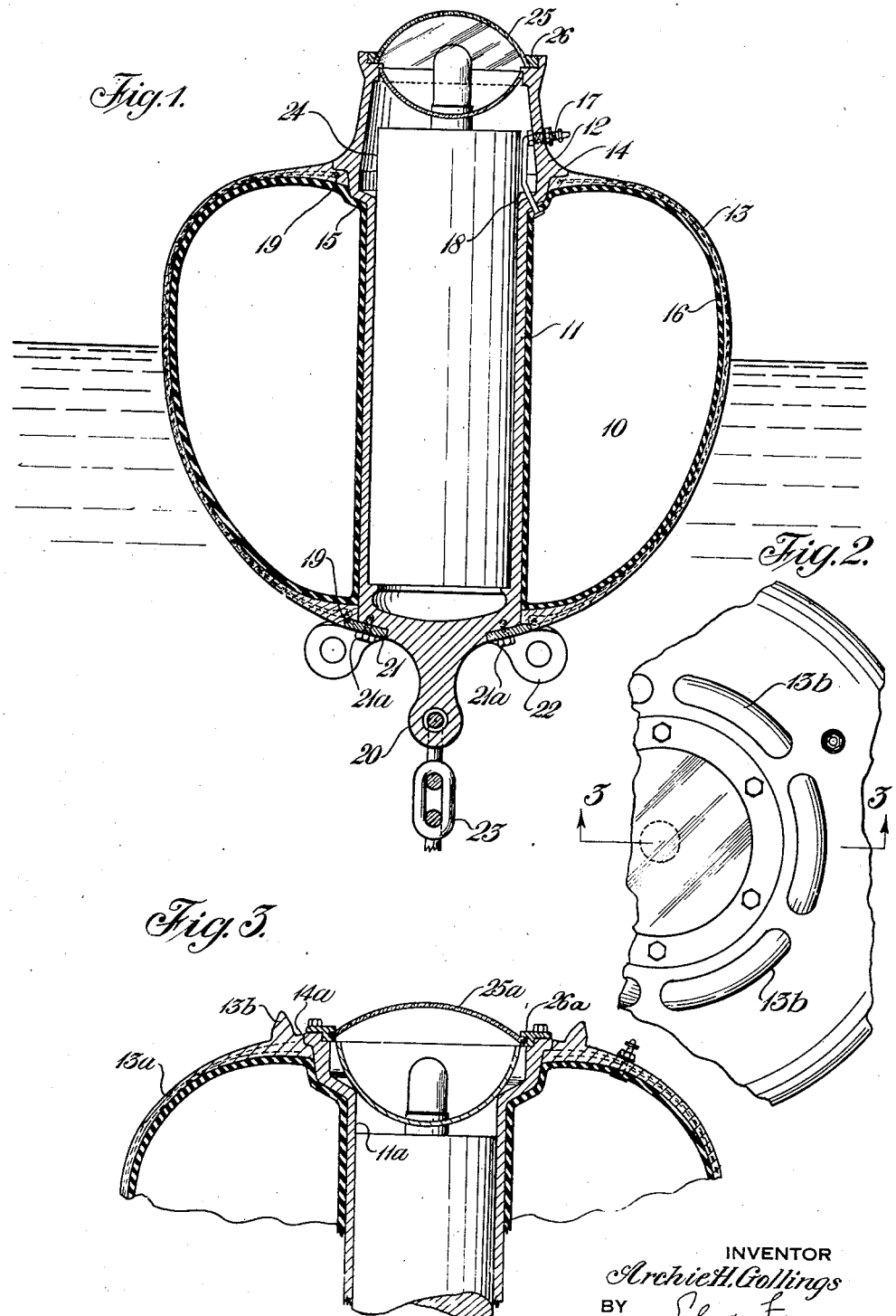

2,324,983

UNITED STATES PATENT OFFICE 2,324,983

RUBBER LIGHT BUOY

Archie H. Gollings, Akron, Ohio, assignor to The Firestone Tire & Rubber Company, Akron, Ohio, a corporation of Ohio Application July 9, 1940, Serial No. 344,535

4 Claims. (Cl. 9—8.3)

This invention relates to light or mooring buoys, specially to pneumatic rubber light buoys for use in designating landing fields for sea planes.

Heretofore various types of light buoys for seadromes have been made but are objectionable for any of several reasons. That is, some of these light buoys have sharp edges thereon which damage boats or airplane fuselages contacting same, or the light buoys cannot stand the physical abuse to which the buoys are subjected, or the buoys are quite expensive, or do not maintain a substantially constant position in the water, etc.

The general object of the present invention is to overcome the foregoing and other objections to known types of light buoys for use in seadromes.

A further object of the invention is to provide an inexpensive, easily-constructed, pneumatic rubber buoy which is adapted to stand the exposure and physical abuse attendant its use.

The foregoing and other objects will be manifest from the following specification which will be described with particular reference to the accompanying drawing, in which:

Figure 1 is a vertical sectional elevation of a pneumatic rubber light buoy embodying the invention;

Figure 2 is a fragmentary plan of a modified embodiment of the invention; and

Figure 3 is a fragmentary vertical sectional elevation of the light buoy shown in Figure 2.

Referring specifically to Figure 1 of the drawing, a pneumatic light buoy 10 is shown which mainly comprises a frame member shown as being a hollow cylindrical container 11, having a closed lower end and an enlarged upper end 12, around which a flexible tire, or confining member 13 is positioned. This container 11 has an integral outwardly extending flange 14 formed on its outer periphery in its end 12 and a shoulder 15 formed thereon immediately below the flange 14. The remaining and lower portion of the container 11 is cylindrical and adapted to receive and engage with the confining member 13. An inflatable float or tube 16, in this case a rubber tube, is received within the confining member 13 and is connected to the atmosphere through a valve 17. The valve 17 engages with the portion 12 of the container 11 and has an arm 18 thereon which extends to the inside of the float and connects to the tube 16. The confining member 13 may be formed of any suitable inextensible flexible material, and is illustrated as being made from a rubberized fabric assembly, such as a pneumatic tire construction. This includes inextensible bead rings 19, made from wire, which are positioned therein adjacent the edges thereof, whereby the diameter of the edges of the confining member is controlled. Balloon fabric is another material from which the confining member 13 can be made. In such case the confining member might be made tubular and inflatable whereby the float 16 could be omitted.

After the float 16 has been placed within the confining member 13, the assembled unit can be slid over the container 11, usually from the bottom thereof. Then the float 16 can be inflated in order to render the buoy 10 capable of floating upon the water. A retaining ring 21 is associated with the container 11 at the lower end thereof. This ring 21 is received in an annular groove in the base of the container and extends outwardly from the cylindrical periphery of the container, whereby a seat or confining lug is formed for the lower end of the confining member 13. The ring usually is removably associated with the container through bolts 21a and has integral outwardly extending eyelets 22 formed thereon. These eyelets are adapted to engage with an anchor chain used in positioning the buoy 10. An anchor chain 23 is shown engaged with an integral eyelet 20 formed on the base of the container 11. This chain has a swivel member (not shown) present therein whereby the buoy 10 can be pivoted on its axis without detriment to the means anchoring same.

The light producing means associated with the light buoy 10 are carried in the container 11 and include suitable energy supply means (not shown), which are positioned in a cylindrical member 24, that is received within the container 11. Any desired light producing means, which may comprise a fluorescent light as shown, is carried on the upper end of the member 24 and is connected to the energy supply means carried in the container 11. A lens 25 is removably secured to the upper end of the container 11 by a confining ring 26 that engages with the container. Then the buoy is completed and is ready for assembly in water, at which time the light of the buoy extends a short distance above the water and is visible from an appreciable distance.

In some instances, it may be desirable to use a gas, or an oil lamp in the light buoy 10. Then the supply of oil or gas used to operate the light could be carried in the lower end of the container 11, or, if desired, in a tank resting on the floor of the ocean and associated with the anchor means for the buoy. Some counterweight always should be carried in the lower end of the container to maintain it vertical.

Any object in the water adjacent the buoy 10 will only strike the resilient portion thereof and will not be damaged. The fact that the tire 13 is of larger cross section adjacent its upper edge plus the anchor means secured to the lower end of the buoy aid in retaining the buoy vertical and in a given position.

From the foregoing description it will be apparent that an inexpensive, easily-constructed buoy is provided by the invention and that the general objects of the invention have been achieved.

Figures 2 and 3 of the drawing show a modification of the invention. Here a container 11a, having a slightly different type of upper end from the container 11, is provided. In this case, the container does not extend above the flange 14a formed thereon, with which the confining member 13a engages. The confining member 13a has upwardly extending lugs 13b formed thereon adjacent its upper bead to strengthen same and aid in securing the confining member to the container. The lug also prevents objects from striking the upper end of the container 11a. A lens 25a covers the upper end of the container 11a and is secured thereto by a clamping ring 26a. This embodiment of the invention does not extend quite as far above the water surface as does the form of invention shown in Figure 1, which action is desirable in some cases.

While several embodiments of the invention have been completely illustrated and described herein, it will be apparent that modifications of the invention may be made without departing from the scope of the invention, as defined in the appended claims.

What is claimed is:

1. A light buoy comprising a hollow cylindrical metal container having a closed lower end and an integral flange formed on its outer periphery adjacent its upper end, said container having an integral eyelet formed on its closed end adapted to engage with anchoring means for the light buoy, light producing means, energy supply means for said light producing means mounted within said container and positioning said light producing means adjacent the upper end of said container, a lens removably secured to the upper end of said container, an annular ring associated with and extending outwardly from the lower end of said container, a pneumatic tire positioned around said container and engaging with said integral flange and said annular ring to limit its position thereon, and an inflatable rubber member received in said tire whereby the light buoy can be made to float upon water.

2. A light buoy comprising a hollow cylindrical metal container having a closed lower end and an integral flange formed on its outer periphery adjacent its upper end, light producing means, energy supply means for said light producing means mounted within said container and positioning said light producing means adjacent the upper end of said container, an annular ring associated with the lower end of said container, a pneumatic tire positioned around said container and engaging with said integral flange and said annular ring to limit its position thereon, and an inflatable rubber member received in said tire whereby the light buoy can be made to float upon water.

3. A light buoy comprising a hollow cylindrical metal member having a closed lower end, said member having an integral eye formed on the lower end thereof to engage with anchor means for the light buoy, a light, energy supply means for said light received in said member and mounting said light adjacent the open upper end thereof, a lens closing the upper end of said member but enabling light to pass therefrom, said member having an integral enlargement formed on its outer surface adjacent the upper end thereof, annular flexible inflatable means engaged with and extending outwardly from the periphery of said member to provide buoyancy for the light buoy, said means extending substantially the entire length of said member, and a ring removably secured to said member and extending outwardly therefrom adjacent the lower end thereof, said ring and said integral enlargement positioning said inflatable means upon said member.

4. A light buoy comprising a hollow cylindrical metal member having a closed lower end, a lens covering the upper end of said member, a light, energy supply means for said light received in said member and mounting said light adjacent but below the open upper end thereof whereby light rays from said light can pass from said member and be readily visible from any point above the plane of the top of said member, said member having an integral enlargement formed on its outer surface adjacent the upper end thereof, a flexible inflatable rubber member engaged with the periphery of said member to provide buoyancy for the light buoy, said means extending substantially the entire length of said member, and a ring removably secured to said member and extending outwardly therefrom adjacent the lower end thereof, said ring and said integral enlargement positioning said inflatable means upon said member.

ARCHIE H. GOLLINGS.